United States Patent
Bera

(10) Patent No.: US 7,954,043 B2
(45) Date of Patent: May 31, 2011

(54) CONCURRENT EDITING OF A FILE BY MULTIPLE AUTHORS

(75) Inventor: Rajendra Kumar Bera, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1914 days.

(21) Appl. No.: 10/307,838

(22) Filed: Dec. 2, 2002

(65) Prior Publication Data

US 2004/0107224 A1 Jun. 3, 2004

(51) Int. Cl.
*G06F 17/00* (2006.01)
(52) U.S. Cl. ........ 715/200; 715/277; 707/781; 707/783; 707/785
(58) Field of Classification Search ............ 707/3, 9–10, 707/203, 781, 783, 785; 715/200, 277
See application file for complete search history.

(56) References Cited

U.S. PATENT DOCUMENTS

| | | | |
|---|---|---|---|
| 5,093,918 A | 3/1992 | Heyen | |
| 5,220,657 A * | 6/1993 | Bly et al. | 711/152 |
| 5,787,175 A | 7/1998 | Carter | |
| 5,892,513 A | 4/1999 | Fay | |
| 6,005,571 A | 12/1999 | Pachauri | |
| 6,023,715 A * | 2/2000 | Burkes et al. | 715/207 |
| 6,067,551 A * | 5/2000 | Brown et al. | 707/203 |
| 6,088,702 A * | 7/2000 | Plantz et al. | 707/103 R |
| 6,266,682 B1 | 7/2001 | LaMarca | |
| 6,405,225 B1 * | 6/2002 | Apfel et al. | 715/526 |
| 6,505,233 B1 | 1/2003 | Hanson | |
| 6,507,865 B1 | 1/2003 | Hanson et al. | |
| 6,525,747 B1 | 2/2003 | Bezos | |
| 6,732,090 B2 * | 5/2004 | Shanahan et al. | 707/3 |
| 6,744,447 B2 | 6/2004 | Estrada | |
| 6,769,013 B2 | 7/2004 | Frees | |
| 7,152,220 B2 | 12/2006 | Rickards, III et al. | |
| 7,392,254 B1 * | 6/2008 | Jenkins | 1/1 |
| 7,437,421 B2 | 10/2008 | Bhogal | |
| 7,673,006 B2 | 3/2010 | Bhogal | |
| 2001/0000811 A1 | 5/2001 | May | |
| 2001/0003202 A1 | 6/2001 | Mache | |
| 2001/0037273 A1 | 11/2001 | Greenlee | |
| 2001/0039553 A1 | 11/2001 | LaMarca | |
| 2002/0065848 A1 * | 5/2002 | Walker et al. | 707/511 |

(Continued)

FOREIGN PATENT DOCUMENTS

CA 2457817 A1 8/2004

(Continued)

OTHER PUBLICATIONS

Cederqvist et al., "Version Management with CVS," 1993, 1.11.19, pp. 1-184, US.

(Continued)

*Primary Examiner* — Hanh B Thai
(74) *Attorney, Agent, or Firm* — Anthony V S England; William Steinberg

(57) ABSTRACT

A method, system and computer program product for enabling the concurrent editing of a document containing a plurality of independent or loosely connected segments by multiple authors is described. Among other things, the invention allows assigning of editing rights for each segment to a defined set of segment authors, making available a special segment that contains metadata shared by all the segments of said documents, and providing email means private to said document, for facilitating communication between the authors of the document.

30 Claims, 3 Drawing Sheets

U.S. PATENT DOCUMENTS

| | | | |
|---|---|---|---|
| 2002/0099777 A1 | 7/2002 | Gupta | |
| 2002/0107994 A1 | 8/2002 | Rickards, III et al. | |
| 2002/0109707 A1* | 8/2002 | Lao et al. | 345/700 |
| 2003/0028600 A1 | 2/2003 | Parker | |
| 2003/0050981 A1 | 3/2003 | Banerjee | |
| 2003/0061200 A1* | 3/2003 | Hubert et al. | 707/3 |
| 2003/0182177 A1 | 9/2003 | Gallagher | |
| 2003/0220855 A1 | 11/2003 | Lam | |
| 2003/0237051 A1 | 12/2003 | LaMarca | |
| 2004/0044648 A1 | 3/2004 | Anfindsen | |
| 2004/0172450 A1 | 9/2004 | Edelstein | |
| 2004/0205653 A1 | 10/2004 | Hadfield | |
| 2004/0230658 A1 | 11/2004 | Estrada | |
| 2004/0267871 A1 | 12/2004 | Pratley | |
| 2005/0033811 A1 | 2/2005 | Bhogal | |
| 2005/0034079 A1 | 2/2005 | Gunasekar | |
| 2005/0055306 A1 | 3/2005 | Miller | |
| 2005/0188016 A1 | 8/2005 | Vdaygiri | |
| 2008/0263155 A1 | 10/2008 | Bhogal | |
| 2009/0083384 A1 | 3/2009 | Bhogal | |

FOREIGN PATENT DOCUMENTS

| | | |
|---|---|---|
| EP | 1 104 964 A1 | 6/2001 |
| JP | 5135056 | 6/1993 |
| JP | 8202688 | 8/1996 |
| JP | 9054719 | 2/1997 |
| JP | 2003058532 | 2/2003 |
| JP | 2003203168 | 7/2003 |
| WO | WO 02/1823 A2 | 1/2002 |
| WO | WO 02/073886 A1 | 9/2002 |

OTHER PUBLICATIONS

Dynamically Structured Messaging Mechanism, IBM Technical Disclosure IPCOM000013071D, Original Publication Date: Apr. 13, 2001. IP.com Electronic Publication: Jun. 12, 2003.

Ellis, et al, "Groupware: Some Issues and Experiences," Jan. 1991, pp. 38-58, vol. 34, No. 1, ACM, US.

Fogel, Karl, "Open Source Development with CVS," Jun. 25, 2002, pp. 107-109, 140-147, Second Edition, Ohmsha, Ltd, Japan.

Project Magic, IBM Technical Disclosure IPCOM000014501D, Original Publication Date: Oct. 1, 2000, IP.com Electronic Publication: Jun. 19, 2003, IP.com Electronic Publication: Jun. 12, 2003.

Stefik et al., "WYSIWIS Revised: Early Experiences with Multiuser Interfaces," ACM Transactions on Office Information Systems, vol. 5, No. 2, Apr. 1987.

Notice of Allowance Dated Apr. 9, 2008 in U.S. Appl. No. 10/835,336.

Notice of Allowance Dated Oct. 13, 2009 in U.S. Appl. No. 12/143,426.

Office Action Dated Apr. 29, 2010 in Canada, Application No. 2532776.

Office Action Dated Apr. 2, 2007 in U.S. Appl. No. 10/637,020.
Office Action Dated Sep. 11, 2007 in U.S. Appl. No. 10/637,020.
Office Action Dated Sep. 24, 2007 in U.S. Appl. No. 10/637,020.
Office Action Dated Nov. 2, 2009 in U.S. Appl. No. 12/054,487.
Office Action Dated Mar. 18, 2010 in U.S. Appl. No. 12/054,487.
Office Action Dated Oct. 6, 2010 in U.S. Appl. No. 12/054,487.
Office Action Dated Nov. 2, 2009 in U.S. Appl. No. 12/143,884.
Office Action Dated Apr. 21, 2010 in U.S. Appl. No. 12/143,884.
Office Action Dated Sep. 20, 2010 in U.S. Appl. No. 12/143,884.
Office Action Dated Dec. 6, 2010 in U.S. Appl. No. 12/143,884.

* cited by examiner

CONCURRENT EDITING OF A FILE BY MULTIPLE AUTHORS

BACKGROUND OF THE INVENTION

1. Field of the Invention

This present invention relates to a method, system and computer program product for enabling the concurrent editing of a document containing a plurality of independent or loosely connected segments by multiple authors.

2. Description of the Prior Art

The editing of complex documents such as reference works, committee reports, conference proceedings etc. requires careful handling since such documents are usually large and require attention to details. The human mind when faced with the task of creating such documents, automatically attempts to segment the document into parts that are either independent of or loosely connected to each other. The editing of each part is then carried out with the help of a document editing system.

The segmentation of large complex documents as defined above, suggests the assignment of multiple authors to the task of editing the document with each author being given the responsibility for a subset of segments. Such an approach is a natural method of improving the efficiency of the editing activity. However, such an arrangement requires a document editing system that supports the concurrent editing of the document by multiple authors without interfering with each other's work.

The document editing system facilitates the efficient creation and modification of the document segments. U.S. Pat. No. 5,892,513 describes a document editing system capable of maintaining a large number of complex versioned documents in an efficient manner. However, this patent does not adequately meet the requirements of a document editing system catering to multiple authors working concurrently on a document with non-overlapping segments. Several important features such as an email service to facilitate communication between the authors, provision for managerial and administrative authority over the complete document by a single super author with the authority to assign segment authors and their access rights, means for temporarily suspending the work done on a segment, encryption, decryption and password means are not provided. Hence this invention falls short of fulfilling the needs of a document editing system of the type covered by this invention.

SUMMARY OF THE INVENTION

The object of this invention is to provide a system which overcomes the above mentioned shortcomings and facilitates the concurrent editing by multiple authors of documents consisting of segments that are either independent of or loosely connected to each other.

To achieve the said objective the present invention provides a method for enabling the concurrent editing of a document containing a plurality of independent or loosely connected segments by multiple authors by assigning editing rights for each segment to a defined set of segment authors, making available a special segment that contains metadata shared by all the segments of said documents and providing email means private to the document for facilitating communication between the authors of the document.

The metadata includes definitions, declarations, formatting data and reference glossary of terms covering the entire document.

The invention includes granting viewing rights to defined segments other than the segments for which editing rights have already been assigned.

The present invention further provides a system for enabling the concurrent editing of a document containing a plurality of independent or loosely connected segments by multiple authors, by providing means for assigning editing rights for each segment to a defined set of segment authors, means for making available a special segment that contains metadata shared by all the segments of said documents and means for providing email means, private to said document, for facilitating communication between the authors of the document.

The invention also includes a computer program product for enabling the concurrent editing of a document containing a plurality of independent or loosely connected segments by multiple authors.

BRIEF DESCRIPTION OF THE DRAWINGS

The invention will now be described with reference to the accompanying drawings.

DETAILED DESCRIPTION

Figure 1:
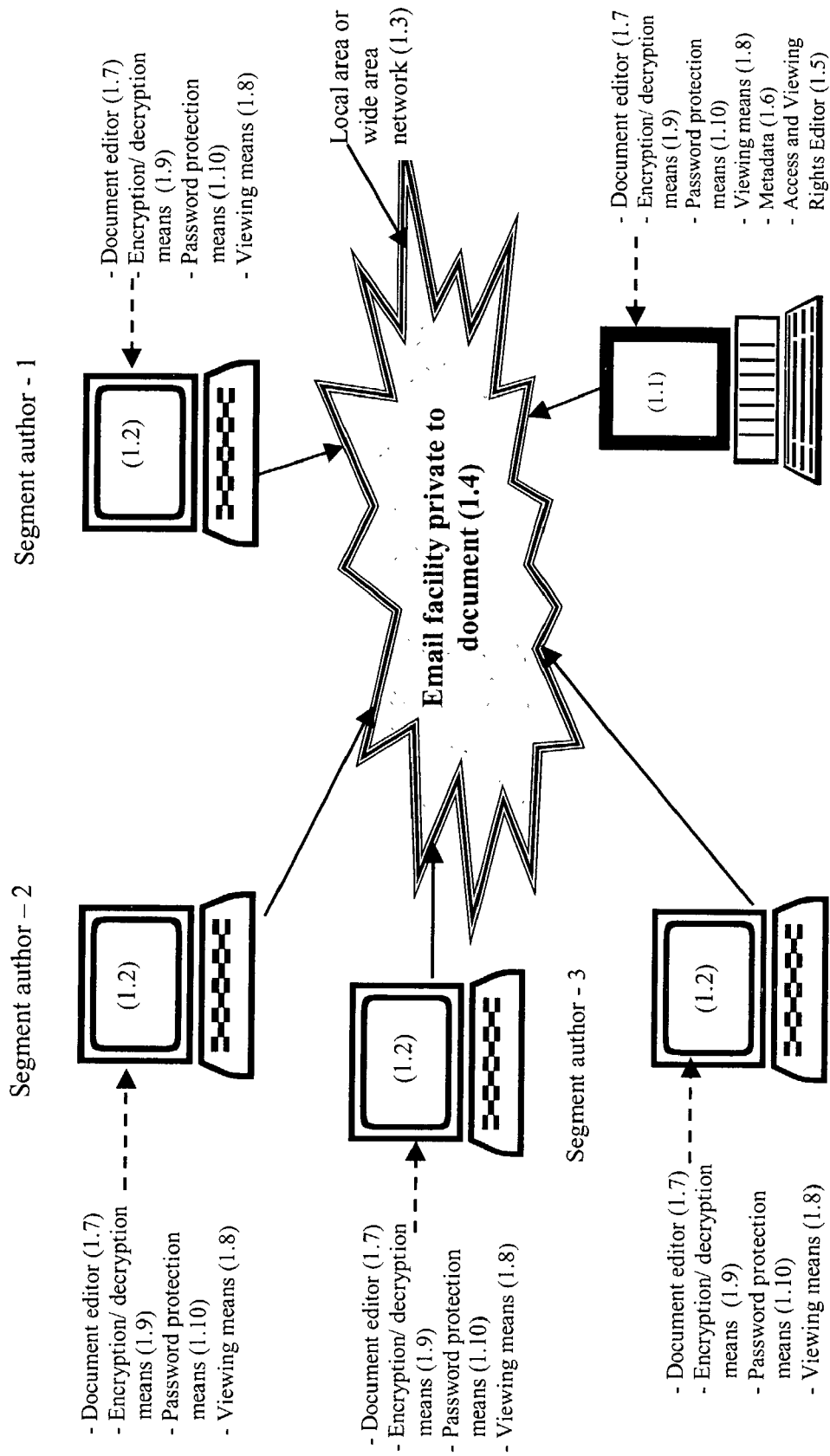
FIG. 1 shows the block diagram of the concurrent document editing system according to this invention.

As shown in FIG. 1, the multiple authors concurrently operate on a single document. Of these multiple authors, one author known as document author (1.1) exercises control over the entire activity while other authors known as segment authors (1.2) edit various segments of the complete document. The authors are all connected to each other over a local area network or wide area network (1.3), which provides a communication medium between them. Email means private to the document (1.4) enable the authors to exchange information relevant to the document. The document author defines viewing and access rights for each segment and each segment author using an access and viewing rights editor (1.5). The document author (1.1) also manages metadata (1.6) that contains definitions, declarations, reference glossary and formatting information common to all segments of the document. Each author has a document editor (1.7) available for providing powerful text and graphics editing capabilities including means for suspending, resuming and viewing document segments in various ways as herein described using viewing means (1.8).

In addition, encryption and decryption means (1.9) and password protection means (1.10) are available to each author for protecting the document from unauthorized access.

The depicted example in FIG. 1 is not meant to imply architectural limitations and the configuration of the incorporating device of the said means may vary depending on the implementation. Any kind of computer system or other apparatus adapted for carrying out the means described herein can be employed for practicing the invention. A typical combination of hardware and software could be a general purpose computer system with a computer program that when loaded and executed, controls the computer system such that it carries out the means described herein. Other examples of the incorporating device that may be used are notebook computers or hand held computers in addition to taking the form of a PDA, web kiosks or even Web appliances.

Figure 2:
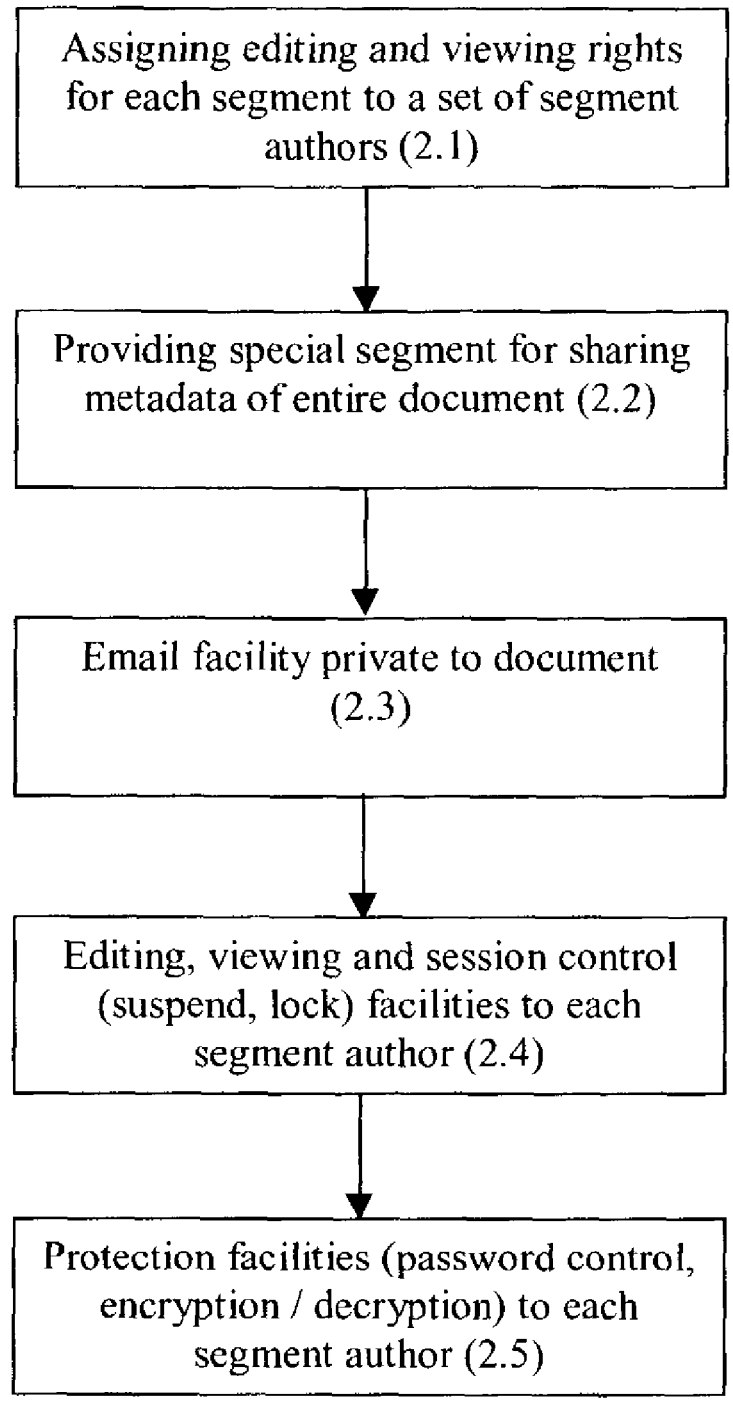
FIG. 2 shows a flow diagram of the facilities provided by this invention.

As shown in FIG. 2, the invention implements several functions for facilitating the activities performed by the segment authors and document author. It provides the document author, means to assign editing and viewing rights for each segment to each set of segment authors (2.1). It also creates a special segment for holding metadata such as formatting information, glossary, definitions and declarations common to the entire document (2.2). Email means that are private to the document are also made available for exchanging information between the segment authors or between segment authors and the document author (2.3). Since a segment author can view the entire document, barring access denied segments, in various views it is possible for the author to maintain a perspective on how the various segments fit into the entire document. While a segment's author cannot edit the segments of other authors, he can use the email means (2.3) to provide hints, suggestions, notes, comments etc. to the segment author. The private email means pipe messages to appropriate document segments and the messages are displayed when the addressee author browses or edits the segment. The private email means can be an off the shelf software providing email exchange services.

In addition, the invention provides each author with powerful editing, viewing and session control means (2.4). Each author is able to view segments either individually or in various combinations based on defined viewing rights. The session control means enable each author to suspend or lock editing sessions based on defined time limits with the possibility of resumption by a defined set of authors.

Encryption/decryption means coupled with password control means facilitate protection of each segment (2.5)

Those of ordinary skill in the art will appreciate that the aforementioned means are instructions for operating on the computing system. The means are capable of existing in an embedded form within the hardware of a computer node or may be embodied on various computer readable media. The computer readable media may take the form of coded formats that are decoded for actual use in a particular information processing system. Computer program means or a computer program in the present context mean any expression, in any language, code, or notation, of a set of instructions intended to cause a system having information processing capability to perform the particular function either directly or after performing either or both of the following:

a) conversion to another language, code or notation
b) reproduction in a different material form.

Figure 3:
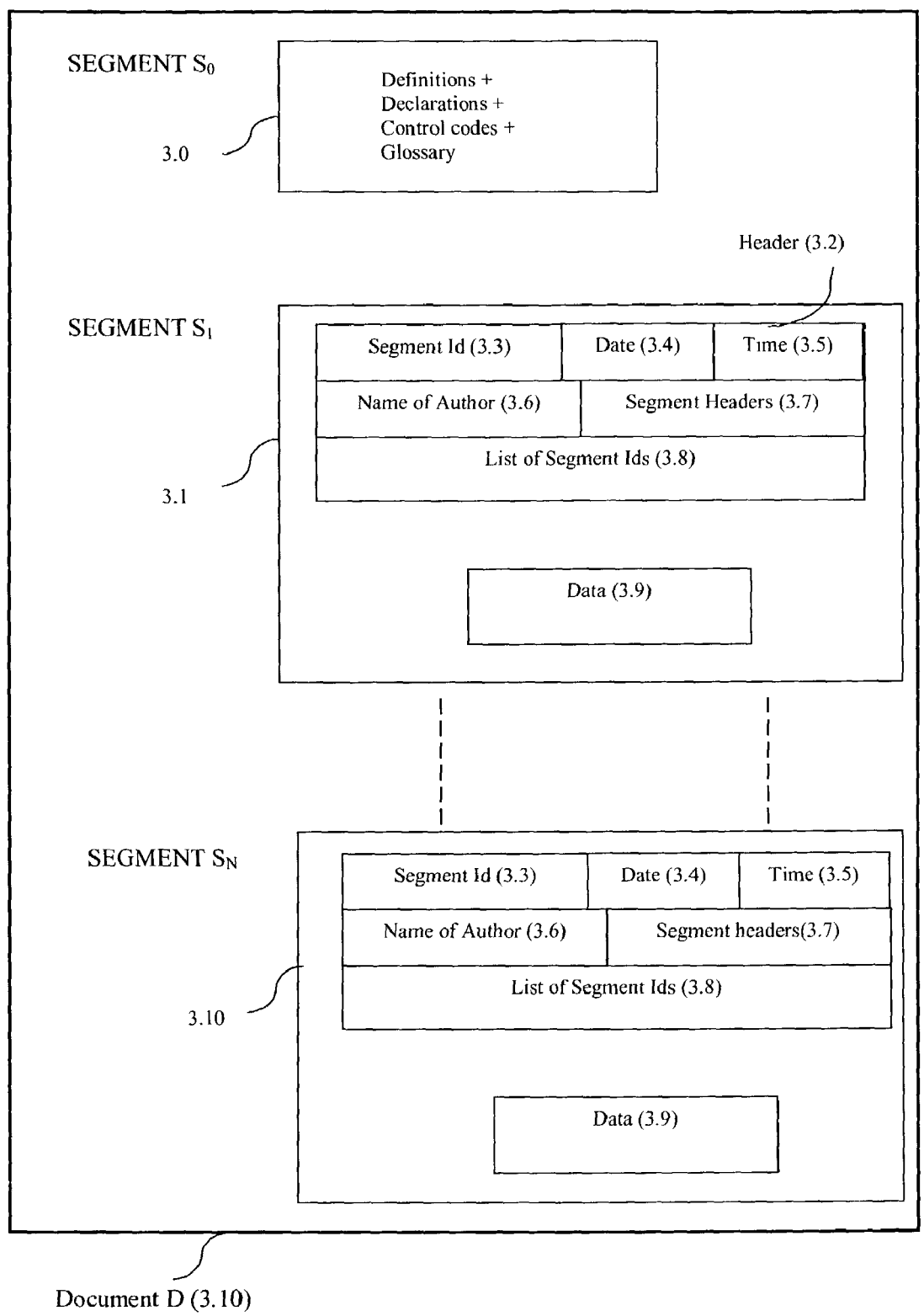
FIG. 3 shows a block diagram of segments of a document.

FIG. 3 shows a block diagram of the segments of a document D (3.11). A special segment $S_0$ (3.0) is created to hold metadata on document D (3.11). This metadata includes those definitions, declarations and control codes that are required for customized formatting and control of D (3.11) and are common to the entire document. Special Segment So (3.0) will also carry a glossary of terms and abbreviations used in D (3.11) as an aid to all the authors in the interests of maintaining consistency of nomenclature and spelling in D (3.11).

Furthermore, a document also contains one or more segments $S_1$ (3.1), $S_2$, $S_3$, ... $S_n$ (3.10). The document D (3.11) is a sequential concatenation of these segments. Each segment including segment $S_1$ (3.1) has a header (3.2) which, among other things, contains segment id (3.3), date (3.4) and time (3.5) when the segment was last saved, name of the author (3.6) who last edited the segment, headers (3.7) of the most recently saved versions of all the segments when segment $S_1$ (3.1) was last opened for editing, and the list of segment ids (3.8) whose headers had changed while $S_1$ (3.1) was being edited.

The information stored in the headers is used to recreate the different views of D (3.11). The segment $S_1$ (3.1) also contains the segment data (3.9) that holds the information entered by the segment author.

In the depicted example, the header (3.2) and data (3.9) of only segment $S_1$ (3.1) are illustrated but the segments $S_2$, $S_3$, ..., $S_n$ (3.10) are also similar in their structure to the segment $S_1$ (3.1). Each segment has a header and some data, the contents of which may vary from segment to segment. Each segment is saved as a separate file, but concatenated on-the-fly to create D (3.11) when either by browsed or edited.

Best Mode for Carrying Out the Invention

Consider a document which is divided into multiple loosely connected or independent segments, $S_0$, $S_1$, $S_2$, $S_3$, $S_4$, ..., $S_n$ as shown in Table 1.

There is a Document Author (DA) associated with the complete document. The DA is the superauthor who has complete managerial control over the document. The DA is responsible for creating the document, dividing the document into segments, and defining the contents of Special Segment $S_0$.

TABLE 1

Document D divided into segments
Document D

| Segment 1 | Segment 2 | ......... | Segment n | Special Segment |
|---|---|---|---|---|
| $S_1$ | $S_2$ | | $S_n$ | $S_0$ |

Editing the Document D

The editing task on each segment of the document is performed by Author Groups which are created by the DA. The DA creates author groups and assigns each author group editing and viewing rights for one or more segment of the document.

TABLE 2

Authors divided into groups for editing segments of Document D
Author Group U

| Author Group 1 |
|---|
| U1<br>Authors : U11, U12, U13, ... ,U1r<br>View Permission Segments $S_1$, $S_2$, $S_3$, $S_4$, $S_6$<br>Edit Permission: Segment $S_1$ |
| Author Group 2 |
| U2<br>Authors : U21, U22, U23, ... ,U2s<br>View Permission: Segments $S_1$, $S_2$, $S_3$, $S_4$, $S_5$, $S_6$<br>Edit Permission: Segment $S_3$<br>............<br>............<br>............ |
| Author Group q |
| Uq<br>Authors: ............<br>View Permission: ............<br>Edit Permission: ............ |

Table 2 shows author groups created by the DA, which are assigned specific viewing or editing rights on a segment of a document. For example, the author group U1 has Viewing Permissions on Segments $S_1$, $S_2$, $S_3$, $S_4$ and $S_6$, but can only Edit Segment $S_1$. Similarly, Author Group U2 has Editing Permissions on Segment $S_3$, but can view Segments $S_1$, $S_2$, $S_3$, $S_4$, $S_5$, and $S_6$. The Author Group U1 contains r number of authors, and Author Group U2 contains s number of authors. In general, an Author Group can contain any number of authors and Document can have any number of Author Groups.

It is possible for one author to belong to more than one author group, and it is also possible for one Author Group to have editing rights on more than one segment of the Document.

At any given time no segment of the document can be edited by more than one author belonging to the author group responsible for editing that segment. Thus, if segment $S_1$ is being edited then only one author from the segment's author group U1 can edit document D. This is to prevent concurrent editing of a segment since such editing may lead to ambiguities. However, document D can be viewed concurrently by more than one author if they have the required permissions.

Suspension & Locking of a Segment

The author, after editing the segment has two options:
1. The author may close the editing session to enable any other author (with the required permissions) to continue editing the document, OR
2. may keep the segment in suspension for some time with the intention of resuming the session later.

So, if the segment $S_1$ is kept in suspension, then the author suspending the segment can name one or more authors from the Author Group U1 who can resume the editing of the segment. To prevent the segment from being inadvertently locked up indefinitely, there is a default time limit, during which if editing of the segment is not resumed to end the suspension, it will be released and brought to the close status. The author suspending the editing session can also specify the time limit. For example, if Segment $S_1$ is being edited by author belonging to group U1 and the author suspends the editing of the segment for any reason, and is unable to resume the editing of the segment within the default specified time limit, then that segment will be brought to a close status, thus, it now can be edited by any author belonging to group U1. It is also possible to lock the segment to prevent it from being edited till the segment is unlocked again.

The communication among authors takes place through an email service, which is private to the document. Since a segment author can view the entire document, barring access denied segments, in various views (explained later), it is possible for an author to maintain a perspective on how the various segments fit into Document D. As the author lacks editing rights on some segments of the document, he/she can send messages to other segment authors in the nature of comments, notes, suggestions, hints etc.

Cutting and pasting from saved segments into any other segment being currently edited is permitted. Search and find operations over D are also permitted.

Deletion of a Segment

Apart from creating a segment in a Document and assigning rights of that segment to an author group, the DA can also remove a segment. There are two ways to remove a segment.
1. Lock the segment, which needs to be deleted, to allow authors access to previous versions of the segment if the header of any other segment being edited has a reference to it. So, if Segment $S_2$ is locked and the Segment $S_1$'s header has reference to Segment $S_2$, the author editing $S_1$ can view the previous saved versions of $S_2$, although no one can edit $S_2$.
2. Remove all traces of the segment, in which case views requiring any version of an erased segment will display a message of that segment being erased.

The id of the segment either locked or completely erased cannot be reassigned to another segment to prevent confusion when views are being created (as mentioned below) which have references to the locked or erased segment. However, if the id of such a segment is required, then the contents of that segment are deleted, but their headers are retained.

Possible Views of the Document D

While editing a segment, the author can view the document according to his/her requirements. The author can also rearrange the segments and hide segments for a customized view. These views are generated on-the-fly by concatenating appropriate versions of each segment as required by the author. To facilitate viewing each segment includes a header, which is used to recreate different views of the Document D. Views are generated using the information stored in the header of each of the segments and the contents of Special Segment $S_0$ provide customization. Listed below are some of the various views provided by the system.

The default view comprises the segment opened for editing and reflects the editorial changes as they are being made in real-time, and the most recent saved version of each of the other segments for which there is no denial of access to the author.

A second option modifies the default view by allowing the segment author to view, in real-time, those other segments which are being concurrently edited. This view can be implemented by creating, for each segment which is being concurrently edited, a shadow buffer, which is a real-time replica of the segment's contents. Other authors will essentially see the contents of the shadow buffer. If for any reason a segment's shadow buffer is not accessible, then the view of that segment will revert to the most recently saved copy of the segment and a warning message will be displayed on the viewer's screen indicating that the shadow buffer is not accessible. A segment author may, at will, deny visibility of the shadow buffer to others.

A third option allows an author to see selectively previously saved versions of one or more segments of D, and to save this view as a separate document.

A fourth option allows an author to see the default view of the document, as it was when the segment being currently edited was last opened for editing.

A fifth option allows an author to see the default view of the document, as it was when the segment being currently edited was last closed.

A sixth option allows an author to see the default view of the document, as it was when the segment being currently edited was last suspended.

Scalability & Security

The segments of the document may be distributed over more than one device capable of storing and manipulating D, with the devices being capable of communicating among themselves directly or through routing devices, such as those available on the Internet, intranets, LANs, etc. Thus, the authors can be geographically separated and can still work on the same document. An email service, private to the document, is available over the connected devices to facilitate communication amongst authors.

The provision of defined access rights and viewing rights for each segment makes the document preparation by multiple authors secure and less error prone. Each segment may be kept in encrypted form when saved, and decrypted when being viewed. Also, access to a segment can be protected through a password system for providing an additional layer of security.

That which is claimed is:

1. A method for enabling concurrent editing of a document containing a plurality of independent or loosely connected segments by multiple authors, comprising the steps of:
   assigning editing rights for each segment of a document to a defined set of segment authors, wherein the editing rights enable each segment's set of authors to create or change their respective segment of the document, and wherein the creating or changing includes concurrently creating or changing the respective segments;
   making available a special segment of the document, wherein the special segment contains metadata of the document shared by all the segments of said document;
   providing email means private to said document, for enabling such an author of the document to send a email message to a certain one of the segments of the document, the email message being addressed to an author of the certain segment; and
   displaying the email message responsive to such an author of the certain segment of the document browsing or editing the certain segment.

2. The method as claimed in claim 1, wherein said metadata includes definitions, declarations, formatting data and reference glossary of terms applicable to the entire said document.

3. The method as claimed in claim 1, further including grant of viewing rights to defined segments other than the segments for which editing rights have been assigned.

4. The method as claimed in claim 3, further including viewing options to enable each author to view selected segments for which viewing rights are granted in accordance with desired preferences, said views being generated on-the-fly by concatenating appropriate versions of each segment, as applicable for the selected views by using the information stored in the headers of each of the segments and the contents of the metadata.

5. The method as claimed in claim 4, wherein the viewing options include:
   first option to open the segment for editing and reflecting the editorial changes as they are being made in real time and allowing viewing of one or more of the most recent saved version of each of the other segments;
   second option to allow the segment author to view contents in real time of those other segments as editing by other authors of the contents of those other segments concurrently occurs;
   third option to selectively combine and view previously saved versions of one or more segments of the document;
   fourth option to provide a view of the document as it was when the segment being currently edited was last opened for editing;
   fifth option to provide a view of the document as it was when the segment being currently edited was last closed; and
   sixth option to provide a view of the document as it was when the segment being currently edited was last suspended.

6. The method as claimed in claim 1, further including a header associated with each segment containing control information pertaining to said segment including date and time of last save, name of author of last editing, references to headers of the most recently saved versions of all segments when said segment was last opened for editing and the list of segments whose headers had changed while said segment was being edited.

7. The method as claimed in claim 1, wherein an author can suspend an editing session for a period not exceeding a defined time limit, with the editing being resumed either by the same author or by one or more designated authors from the set of authors that have been assigned editing rights for said segment.

8. The method as claimed in claim 1, wherein a segment can be locked by a designated author when desired to prevent editing.

9. The method as claimed in claim 1, wherein said segment is encrypted while saving and decrypted while viewing.

10. The method as claimed in claim 1, wherein access to a segment is protected through a password.

11. A system for enabling concurrent editing of a document containing a plurality of independent or loosely connected segments by multiple authors, comprising:
    editing rights assignment means for assigning editing rights for each segment of a document to a defined set of segment authors, wherein the editing rights enable each segment's set of authors to create or change their respective segment of the document, and wherein the creating or changing includes concurrently creating or changing the respective segments;
    creation means for enabling a special segment of the document, wherein the special segment contains metadata of the document shared by all the segments of said document;
    email means private to said document, for enabling such an author of the document to send a email message to a certain one of the segments of the document, the email message being addressed to an author of the certain segment; and
    means for displaying the email message responsive to such an author of the certain segment of the document browsing or editing the certain segment.

12. The system as claimed in claim 11, wherein said metadata includes definitions, declarations, formatting data and reference glossary of terms applicable to the entire said document.

13. The system as claimed in claim 11, further including viewing rights assignment means for granting viewing rights to defined segments other than the segments for which editing rights have been assigned.

14. The system as claimed in claim 13, further including means for providing viewing options to enable author to view selected segments for which viewing rights are granted in accordance with desired preferences, said views being generated on-the-fly by means for concatenating appropriate version of each segment, as applicable for the selected views by using the information stored in the headers of each of the segments and the contents of the metadata.

15. The system as claimed in claim 14, wherein the viewing options include:
    first option comprising means for opening the segment for editing and reflecting the editorial changes as they are being made in real time and means for allowing viewing of one or more of the most recent saved version of each of the other segments;
    second option comprising means to allow the segment author to view contents in real time of those other segments as editing by other authors of the contents of those other segments concurrently occurs;
    third option comprising means to selectively combine and view previously saved versions of one or more segments of the document;
    fourth option comprising means to provide a view of the document as it was when the segment being currently edited was last opened for editing;

fifth option comprising means to provide a view of the document as it was when the segment being currently edited was last closed; and sixth option comprising means to provide a view of the document as it was when the segment being currently edited was last suspended.

16. The system as claimed in claim 11, further including means to create and populate a header associated with each segment to include control information pertaining to said segment including date and time of last save, name of author of last editing, references to headers of the most recently saved versions of all segments when said segment was last opened for editing and the list of segments whose headers had changed while said segment was being edited.

17. The system as claimed in claim 11, further including suspension means for suspending an editing session, by an author, for a period not exceeding a defined time limit and resumption means for resuming editing either by the same author or by one or more designated authors from the set of authors that have been assigned editing rights for said segment.

18. The system as claimed in claim 11, further including locking means for locking a segment by a designated author when desired to prevent editing.

19. The system as claimed in claim 11, further including encrypting means for encrypting said segment while saving and means for decrypting said segment while viewing.

20. The system as claimed in claim 11, including protection means for protecting access to a segment through a password system.

21. A computer program product comprising computer readable program code stored on computer readable storage medium embodied therein for enabling concurrent editing of a document containing a plurality of independent or loosely connected segments by multiple authors, comprising:

computer readable program code means configured for assigning editing rights for each segment of a document to a defined set of segment authors, wherein the editing rights enable each segment's set of authors to create or change their respective segment of the document, and wherein the creating or changing includes concurrently creating or changing the respective segments;

computer readable program code means configured for making available a special segment of the document, wherein the special segment contains metadata of the document shared by all the segments of said document;

computer readable program code means configured for providing email means private to said document, for enabling such an author of the document to send a email message to a certain one of the segments of the document, the email message being addressed to an author of the certain segment; and computer readable program code means configured for displaying the email message responsive to such an author of the certain segment of the document browsing or editing the certain segment.

22. The computer program product as claimed in claim 21, wherein said metadata includes definitions, declarations, formatting data and reference glossary of terms applicable to the entire said document.

23. The computer program product as claimed in claim 21, further including computer readable program code means configured for granting viewing rights to defined segments other than the segments for which editing rights have been assigned.

24. The computer program product as claimed in claim 23, further including computer readable program code means configured to provide viewing options to enable each author to view selected segments for which viewing rights are granted in accordance with desired preferences, said views being generated on-the-fly by computer readable program code means configured for concatenating appropriate versions of each segment, as applicable for the selected views by using the information stored in the headers of each of the segments and the contents of the metadata.

25. The computer program product as claimed in claim 24, wherein the viewing options are provided by:

computer readable program code means configured to open the segment for editing and reflecting the editorial changes as they are being made in real time and to allow the segment author to view one or more of the most recent saved version of each of the other segments;

computer readable program code means configured to allow the segment author to view contents in real time of those other segments as editing by other authors of the contents of those other segments concurrently occurs;

computer readable program code means configured to allow the segment author to selectively combine and view previously saved versions of one or more segments of the document;

computer readable program code means configured to provide a view of the document as it was when the segment being currently edited was last opened for editing;

computer readable program code means configured to provide a view of the document as it was when the segment being currently edited was last closed; and computer readable program code means configured to provide a view of the document as it was when the segment being currently edited was last suspended.

26. The computer program product as claimed in claim 21, further including computer readable program code means to create and populate a header associated with each segment containing control information pertaining to said segment including date and time of last save, name of author of last editing, references to headers of the most recently saved versions of all segments when said segment was last opened for editing and the list of segments whose headers had changed while said segment was being edited.

27. The computer program product as claimed in claim 21, further including computer readable program code means configured for suspending an editing session, by an author, for a period not exceeding a defined time limit, and computer readable program code means configured for resuming said editing session either by the same author or by one or more designated authors from the set of authors that have been assigned editing rights for said segment.

28. The computer program product as claimed in claim 21, further including computer readable program code means configured for locking a segment by a designated author when desired to prevent editing.

29. The computer program product as claimed in claim 21, further including computer readable program code means configured for encrypting said segment while saving and computer readable program code means configured for decrypting said segment while viewing.

30. The computer program product as claimed in claim 21, including computer readable program code means configured for protecting access to a segment through a password system.

* * * * *